(12) United States Patent
Mauthe et al.

(10) Patent No.: US 7,446,557 B2
(45) Date of Patent: Nov. 4, 2008

(54) ADJUSTING DRIVER STAGE OUTPUT IMPEDANCE

(75) Inventors: Manfred Mauthe, Grosshelfendorf (DE); Henrik Icking, München (DE)

(73) Assignee: Infineon Technologies, Munich (DE)

( * ) Notice: Subject to any disclaimer, the term of this patent is extended or adjusted under 35 U.S.C. 154(b) by 75 days.

(21) Appl. No.: 11/364,961

(22) Filed: Feb. 28, 2006

(65) Prior Publication Data
US 2006/0197550 A1    Sep. 7, 2006

(30) Foreign Application Priority Data
Feb. 28, 2005   (DE) .................. 10 2005 009 593

(51) Int. Cl.
*H03K 17/16*  (2006.01)
*H03K 19/003* (2006.01)

(52) U.S. Cl. ........................................ 326/30
(58) Field of Classification Search ............. 326/30
See application file for complete search history.

(56) References Cited

U.S. PATENT DOCUMENTS 5,606,275 A * 2/1997 Farhang et al. ........... 327/108
6,307,424 B1 * 10/2001 Lee ........................... 327/530
6,414,512 B1 * 7/2002 Moyer ......................... 326/30
6,703,908 B1 * 3/2004 Ruesch et al. ............ 333/17.3
6,750,796 B1 * 6/2004 Holloway et al. .......... 341/143

OTHER PUBLICATIONS

Maxim [Hrsg.], "A Simple ADC Comparison Matrix," Application Note 2094; Jun. 2, 2003, Maxim Integrated Products Inc., Sunnyvale CA 90486, pp. 1-3.

* cited by examiner

*Primary Examiner*—Matthew C. Tabler
(74) *Attorney, Agent, or Firm*—Brinks Hofer Gilson & Lione

(57) ABSTRACT

In order to generate a control signal for adjusting a driver stage with an adjustable output impedance, an impedance signal is generated for a measure of the output impedance of the driver stage. The difference between the impedance signal and a reference signal is calculated, and passed to a sigma-delta modulator to generate a digital bitstream signal. The control signal is then generated depending on the bitstream signal, where the frequencies of the two signal states in the bitstream signal are evaluated by means of digital counters. Depending on the difference of the determined frequencies of the two signal states, a counter is increased or reduced, and the control signal is generated depending on the count of the counter. The impedance signal may be generated by a replica circuit of a pull-up region or a pull-down region of the driver stage to be adjusted.

34 Claims, 9 Drawing Sheets

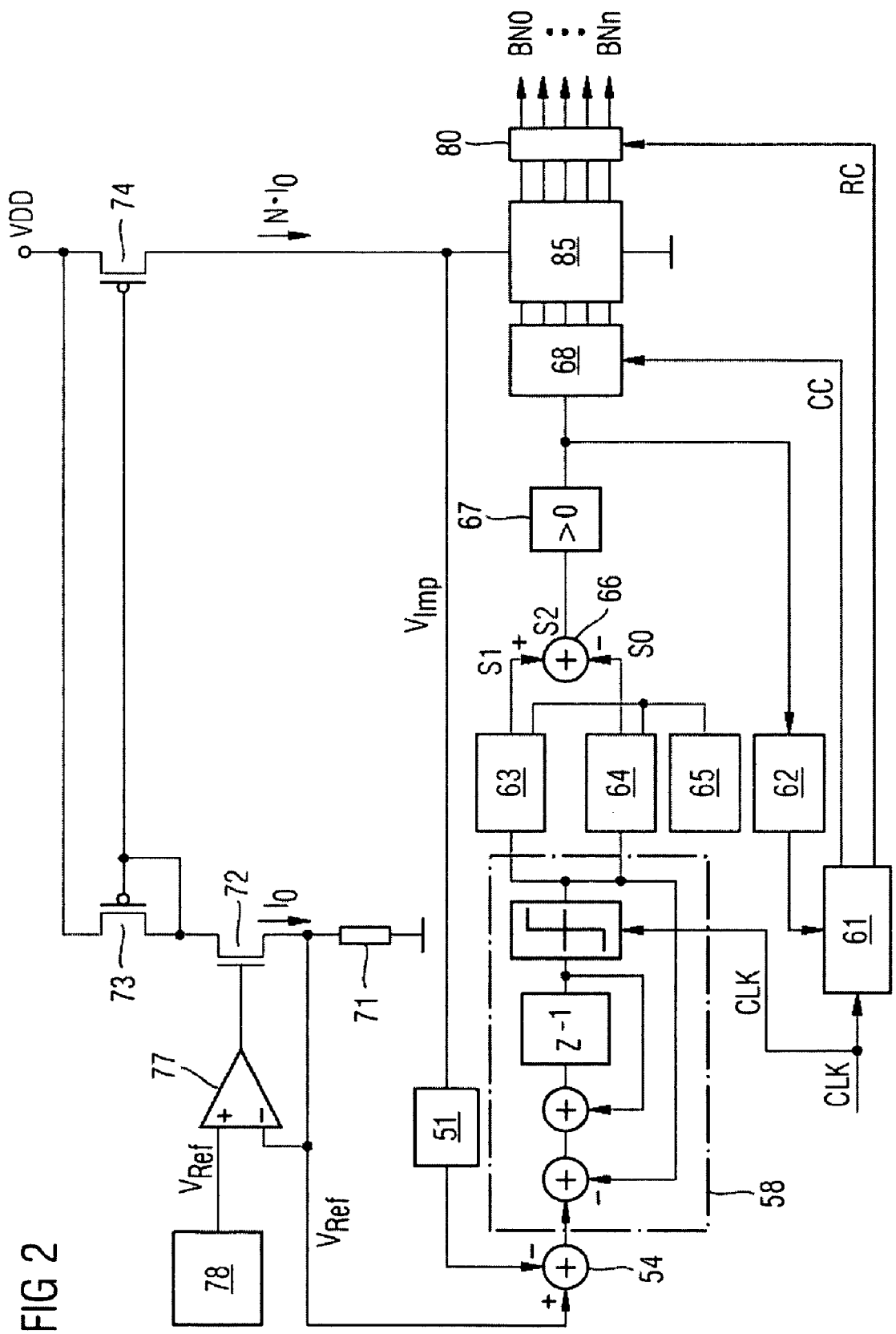

ND STAGE OUTPUT IMPEDANCE

ADJUSTING DRIVER STAGE OUTPUT IMPEDANCE

PRIORITY AND CROSS REFERENCE TO RELATED APPLICATION

This application claims priority to German Patent Application No. DE 10 2005 009 593.3, filed Feb. 28, 2005, which is incorporated in its entirety by reference herein.

BACKGROUND OF THE INVENTION

1. Field of the Invention

The present invention relates to a driver stage, and particularly to adjusting the output impedance of a driver stage for use in data transmission between semiconductor components.

2. Description of the Related Art

In data transmission between semiconductor components, the impedance properties of an interconnection line may have significance, specifically at high data rates. If an output resistance of a transmitter and/or the input resistance of a receiver are not matched to a line impedance, reflections arise at the line ends and overshooting and undershooting occur. As a result, the data transmission may not be accurate, and the signal falsified. Terminal resistors that are matched as accurately as possible to the line impedance may be integrated in transmitter and receiver modules. However, resistors based on polysilicon integrated in semiconductor components may have a resistance that fluctuates depending on process properties, temperature, and the supply voltage.

FIG. 7 shows diagrammatically a model for the data transmission between two semiconductor components including a transmitter 100 and a receiver 140. The connection between the semiconductor components 120 is effected by two lines, both characterized by a line impedance Z. The transmitter 100 has a differential output with a positive data output DP and a negative data output DM, corresponding to the two lines. The respective output resistors of the transmitter 100 are shown diagrammatically by R1, while the respective input resistors of the receiver 140 are shown diagrammatically by resistors R2.

FIG. 8 shows a typical configuration of the drive stage of a transmitter 100, such as the transmitter 100 of FIG. 7. The transmitter 100 has a pre-driver stage 11, configured to convert an input signal from an individual line into a differential signal for transmission via the two lines. One of two output driver stages 12, 14 is associated with each of the two signal components of the differential signal.

The output driver stages 12, 14 each include an inverter having a series connection of a pull-up transistor 15, two resistors 18 and a pull-down transistor 16 connected in sequence between a positive voltage source and a negative voltage source. The positive voltage source may be a positive supply voltage and the negative voltage source may be a ground. The pull-up transistor 15 is configured as a PMOS transistor, and the pull-down transistor 16 is configured as an NMOS transistor. A tapping for the output signal DP or DM is provided between the two resistors 18. The output resistance and the output impedance of the output driver stages 12, 14 are thus determined substantially by the value of the resistors 18.

In order to be able to match the output impedance of a driver stage as accurately as possible to the employed power impedance and to compensate for the influences of variations due to the production process, temperature or fluctuations in the supply voltage, the driver stage may be configured to have an adjustable output impedance. For example, a driver stage having multiple inverter branches may have an adjustable output impedance that can be adjusted depending on control signals. Individual inverter branches are activated and deactivated to adjust the output impedance of the driver stage, such that the output impedance is lower the more inverter branches that are activated.

Multiple control signals that are generated depending on the output impedance of the driver stage to be adjusted are used. The number of driver elements connected in parallel (i.e. the number of inverter branches) may be adjusted such that the output impedance of a pull-up region and pull-down region corresponds to a reference resistance, or to a multiple of a reference resistance. A voltage that decreases over the pull-up region or the pull-down region is measured, and is compared by a comparator to a voltage drop over the reference resistor. The counting direction of a counter is controlled on the basis of the output signal of the comparator, whereby inverter branches are activated or deactivated depending on the count. If the count only alternates between two adjacent values, the output impedance of the pull-up region or of the pull-down region is matched with the reference resistor. However, a problem arises in this case that only interferences that occur in the frequency range above the clock pulse frequency of the control circuit can be filtered out. An interfering, low-frequency noise thus remains.

A voltage drop at the driver stage may be averaged by oversampling so that noise that occurs in the measurement of the output impedance can be suppressed. There is still however a problem that errors are produced due to a voltage misalignment of the comparator and due to the noise at the comparator inputs. In particular the supply voltage of the circuit is implicated as noise source. This noise affects both inputs of the comparator (i.e., the falling voltage at the driver stage), which is a measure of the output impedance, as well as the reference voltage. Overall, fluctuations of the output impedance from the desired impedance (i.e., the line impedance) may therefore arise that are greater than the minimal step width of the impedance adjustment.

Accordingly, there is a need for an improved accuracy in the adjustment of the output impedance of a driver stage so that the output impedance of the driver stage may be adjusted with an accuracy that ensures that the actual output impedance of the driver stage differs from a reference resistance by less than the minimal step width of the adjustment.

SUMMARY OF THE INVENTION

The present invention relates to the adjustment of the output impedance of driver stages that are configured with adjustable output impedance. To this end an impedance signal may be generated to serve as a measure of the output impedance of the driver stage. This impedance signal may be tapped, for example, directly at the signal output of the driver stage, so that a current may be impressed over the signal output of the driver stage in a pull-up region or a pull-down region of the driver stage.

A difference between the impedance signal and a reference signal is formed to generate a difference signal. The difference signal is passed to a modulator, such as a sigma-delta modulator, in order to generate a bitstream signal. A control signal for adjusting the output impedance is generated depending on the bitstream signal of the sigma-delta modulator.

The use of the sigma-delta modulator for processing the difference signal, which is an analog signal, supplies a digital bitstream signal that in a clock pulse period can be one of two possible states, in which the frequency with which one or other of the two states occurs depends on the value of the difference signal fed to the sigma-delta modulator. The bitstream signal in this connection is insensitive to noise and, due to the principle of the sigma-delta modulator, problems due to the voltage misalignment of a comparator are avoided.

Preferably, to generate the control signal, the respective frequency with which the two signal states occur is determined, and a frequency difference is established, in which this frequency difference reflects in digital form the difference of the impedance signal and of the reference signal. The frequency difference is then compared with a threshold value and a counter is increased or reduced depending on the comparison result. The control signal for adjusting the output impedance is then generated depending on the count of the counter.

The determination of the frequency with which one of the two states occurs preferably involves increasing a frequency counter for this state when the signal state is detected, and evaluating the count of the frequency counter after a predetermined number of clock pulse periods. After evaluating the count the frequency counter is reset. This implementation for determining the frequency ensures at the same time an averaging over several clock pulse periods of the sigma-delta modulator, whereby low-frequency noise (i.e., noise in the frequency range below the clock pulse frequency of the sigma-delta modulator) is filtered out.

The frequency of the two states in the bitstream signal can be determined by means of a separate frequency counter for each of the two signal states. Alternatively, the frequency may be determined for one of the two signal states by the frequency counter, while the frequency of the other state is calculated as the difference between the predetermined number of clock pulse periods and the frequency determined by means of the frequency counter.

The absolute value of the determined frequency difference may be compared with the absolute value of the frequency difference determined in the preceding evaluation procedure. If the newly-determined frequency difference is greater than the frequency difference determined in the previous evaluation procedure, the control signals are generated on the basis of that count that corresponds to the lower frequency difference. In the adjusted state, an alternating switching does not take place between two settings of the output impedance that lie above or below the desired value for the output impedance. Instead, the value of the output impedance that is closest to the desired value may be retained. For the circuit implementation of the comparison of the frequency difference determined in the preceding evaluation procedure with the newly-determined frequency difference, an additional register may be used, in which the last-determined value for the frequency difference for each case is stored.

A low-pass filtering of the impedance signal may be carried out before calculating the difference between the impedance signal and the reference signal. Due to the low-pass filtering of the impedance signal, high-frequency noise (i.e., noise in a frequency range above the clock pulse frequency of the sigma-delta modulator) is suppressed, and an aliasing (i.e., a convolution of high-frequency interferences into the lower frequency range) is avoided.

An arrangement for adjusting an output impedance of driver stages may be include impedance measuring means to generate an impedance signal that is a measure of the output impedance of the driver stage. A difference-forming means may be provided to calculate the difference between the impedance signal and a reference signal in order to generate a difference signal. A sigma-delta modulator, to which the difference signal is fed, generates a bitstream signal independently of the difference signal. The bitstream signal is fed to control means that generate, depending on the bitstream signal, the control signal for adjusting the output impedance. The control means may include digital counters, by means of which the frequency with which one of the two states occurs in the bitstream signal is determined.

DESCRIPTION OF THE DRAWINGS

The present invention will be further described with reference to the attached drawing on the basis of preferred embodiments. Identical, functionally identical, or similar elements and signals are referred to with the same reference symbols in the figures unless stated otherwise.

FIG. 2 illustrates a block diagram for a circuit implementation of an arrangement for adjusting the output impedance of a driver stage.

DESCRIPTION OF THE PREFERRED EMBODIMENTS

Figure 8:
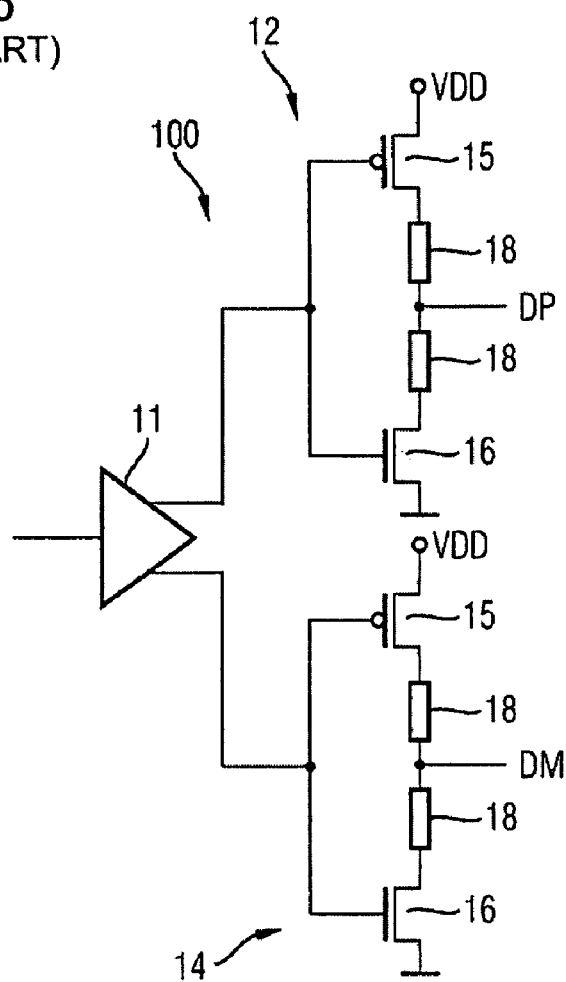
FIG. 8 shows a typical configuration of the drive stage of a transmitter of FIG. 7.
Figure 9:
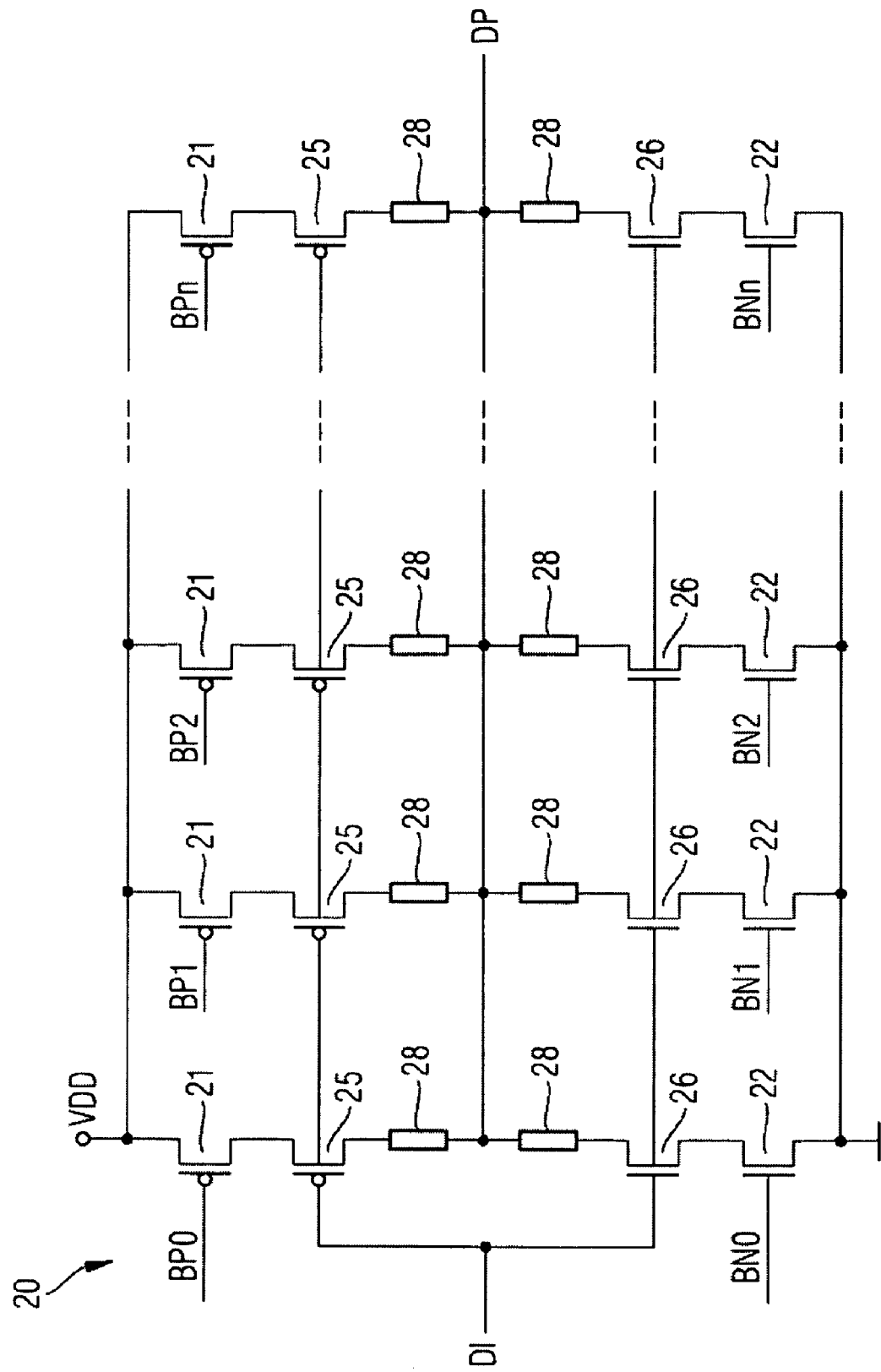
FIG. 9 illustrates a driver stage having a plurality of inverter branches with an adjustable output impedance.

FIG. 9 illustrates a driver stage 20 having an output impedance that can be adjusted depending on control signals BP0, ..., BPn and BN0, ... BNn. The driver stage 20 includes multiple inverter branches that each include a series connection of a pull-up transistor 25, two resistors 28, and a pull-down transistor 26, such as described for FIG. 8. The tapping between the two resistors 28 of each inverter branch is connected to the signal output of the driver stage 20. In addition, the inverter branches each include a control transistor 21 that connects the series connection to the positive voltage source, and a control transistor 22 that connects the series connection to the negative voltage source, or ground. A control transistor 21 is thus associated with each pull-up transistor 25, and a control transistor 22 is associated with each pull-down transistor. The control transistors 21, 22 are in this connection of the same charge carrier type as the pull-up transistors 25 and pull-down transistors 26 associated with them.

The individual inverter branches may be activated and deactivated via the control transistors 21, 22. The output impedance of the driver stage is adjusted depending on the control signals BP0, ..., BPn and BN0, ..., BNn such that, for example, the output impedance is lowered as more inverter branches are activated. The pull-up part and the pull-down part of an inverter branch may be activated or deactivated separately or independently of each other so that the output impedance of the pull-up region and of the pull-down region of the driver stage can be matched separately from one another, and to one another. The pull-up region of the driver stage is in this connection formed by the pull-up parts of the inverter branches, while the pull-down region of the driver stage is formed by the pull-down parts of the inverter branches. The resistors 26 may provide a linear current-voltage relationship of the pull-up region and pull-down region.

To adjust or regulate the output impedance one or more control signals BP0, . . . , BPn and BN0, . . . , BNn are generated depending on the output impedance of the driver stage to be adjusted. The number of driver elements connected in parallel (i.e. the number of inverter branches) may be adjusted such that the output impedance of the pull-up region and pull-down region corresponds to a reference resistance, or to a multiple of a reference resistance. A voltage that decreases over the pull-up region or the pull-down region is measured, and is compared by a comparator to a voltage drop over the reference resistor. The counting direction of a counter is controlled on the basis of the output signal of the comparator, whereby inverter branches are activated or deactivated depending on the count. In an example, when the count alternates between two adjacent values, the output impedance of the pull-up region or of the pull-down region is matched with the reference resistor.

The output impedance for the pull-up region and for the pull-down region of the driver stage 20 results from the number of pull-up parts and pull-down parts of the inverter branches that are in each case connected in parallel. The inverter branches may be configured substantially identically, so that the control signal BP0, . . . , BPn and BN0, . . . , BNn correspond to a digital thermometer coding of a value. Alternatively, another form of coding can also be chosen, for example a binary-weighted coding, in which the resistors 28 and/or the pull-up transistors or pull-down transistors are configured differently for each inverter branch. The control signal for adjusting the output impedance can thus be derived in a simple way from a digitally coded value.

Figure 1A:
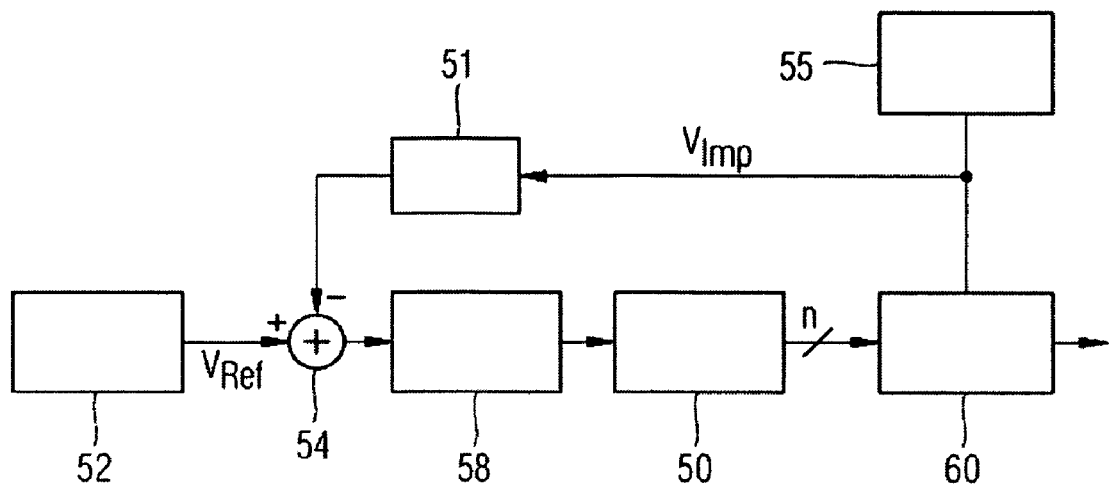
FIGS. 1A, 1B, and 1C illustrate diagrammatically various variants of a circuit for adjusting the output impedance.
Figure 1B:
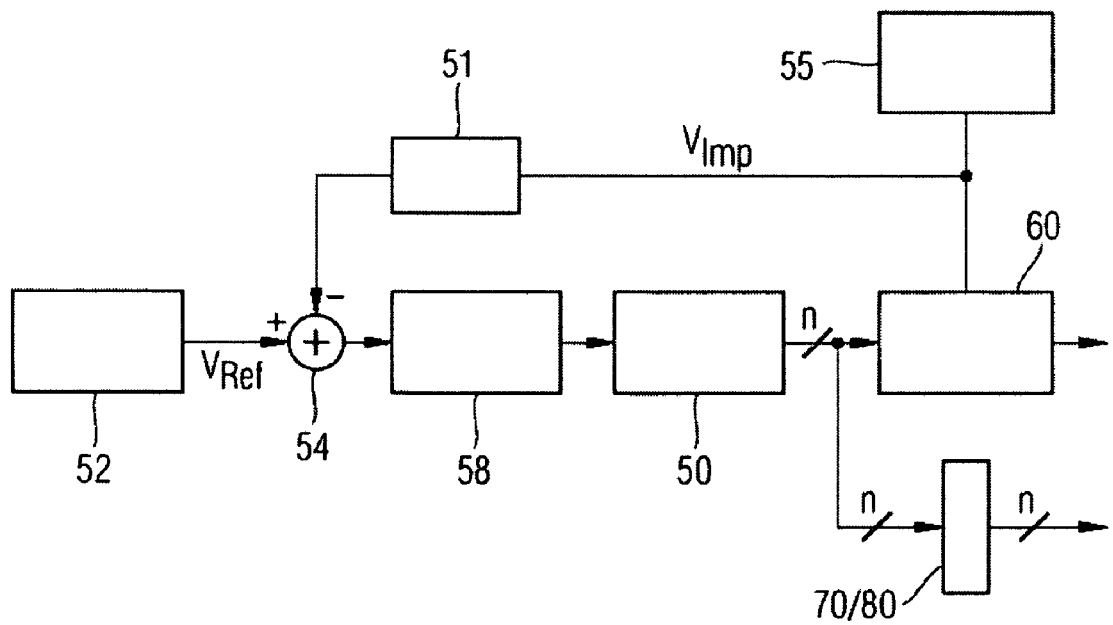
Figure 1C:
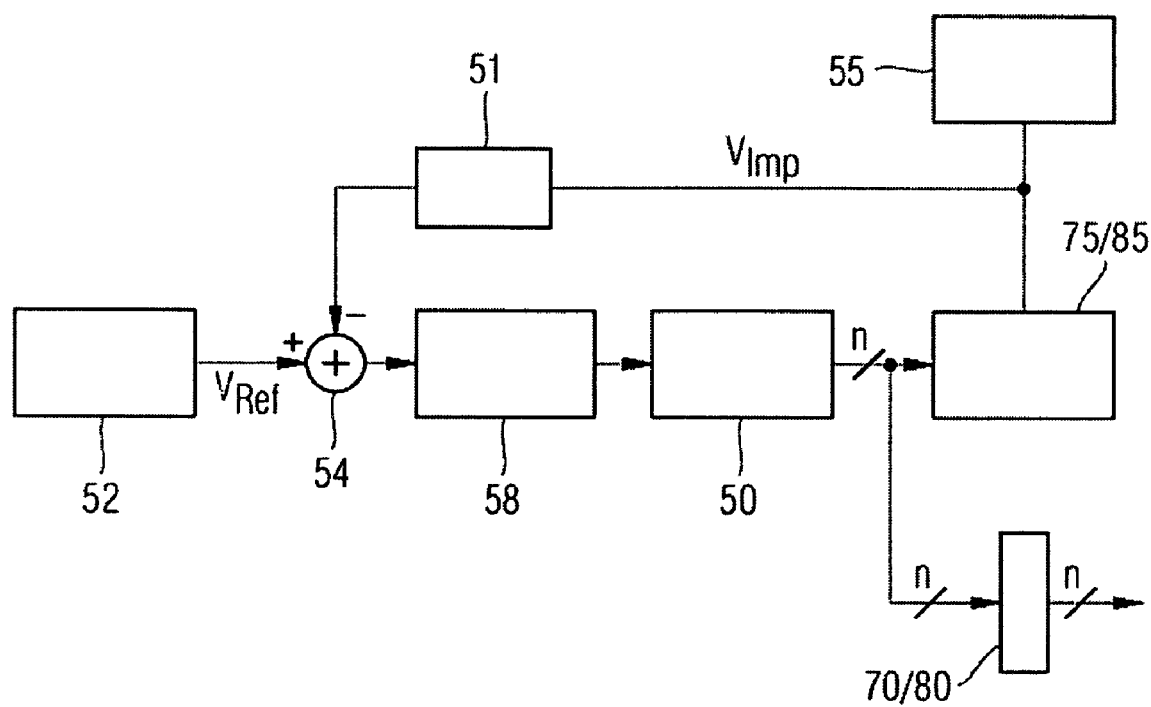

FIGS. 1a, 1b, and 1c illustrate circuit diagrams for arrangements for adjusting the output impedance of a driver stage of the type similar to that illustrated in FIG. 9. The illustrated circuit arrangements may also be suitable for use with differently configured driver stages, as long as they are configured in such a way that their output impedance can be adjusted by a control signal.

The circuit arrangement illustrated in FIG. 1a includes mechanisms 55, 60 that generate an impedance signal that is a measure of the output impedance of a driver stage. In the case of FIG. 1a, the mechanisms 55, 60 that generate the impedance signal include a driver stage 60 and a power source 55 that feeds a current to the pull-up region or the pull-down region of the driver stage 60. The impedance signal then corresponds to the voltage that drops over the pull-up region or the pull-down region of the driver stage. The impedance signal is passed to a low-pass filter 51 that serves to suppress high-frequency interferences and to avoid an aliasing. The filtered impedance signal is then passed to a subtraction node 54, where it is subtracted from a reference signal $V_{Ref}$.

The reference signal $V_{Ref}$ is generated by a reference signal generator 52. The reference signal generator may be an external resistor. In a subtraction node 54, the filtered impedance signal $V_{imp}$ is subtracted from the reference signal $V_{Ref}$ to generate a difference signal. The difference signal is passed to a sigma-delta modulator 58 to generate a digital bitstream signal as an output signal of the sigma-delta modulator 58. The sigma-delta modulator 58 operates at a clock pulse frequency that is predetermined by a correspondingly supplied clock pulse signal (not shown). The bitstream signal can in each case adopt one of two possible signal states in a clock pulse period of the clock pulse signal, which states are identified hereinafter as "0" and "1". The frequency with which the two signal states "0" and "1" occur in the bitstream signal is determined by the value of the difference signal passed to the sigma-delta modulator 58.

A controller 50 evaluates the bitstream signal and, depending on the evaluation result, generates the digital control signal BP0, . . . , BPn and BN0, . . . , BNn to adjust the output impedance, which is passed to the driver stage 60. In the case illustrated in FIG. 1a, the impedance signal $V_{imp}$ is generated directly at the driver stage 60 to be adjusted. For this purpose a current is fed to the pull-up region or to the pull-down region of the driver stage 60 and the driver stage 60 may be in a defined state of its signal output. The generation of the impedance signal $V_{imp}$ during the normal operation for data transmission is therefore not possible. The adjustment of the output impedance consequently takes place during an initialization phase of the driver stage 60 or of a semiconductor component with the driver stage 60. Such an initialization phase may occur during start-up of the semiconductor component. Furthermore, it is also possible to interrupt the normal data transmission operation in order to initiate an initialization phase.

FIG. 1b shows a circuit arrangement that corresponds substantially to that of FIG. 1a. The circuit arrangement of FIG. 1b however provides a temporary storage for the control signal in a register 70, 80. The control signal is available for adjusting further driver stages, such as driver stages that do not have to have their own control circuit for adjusting the output impedance. In this way the adjustment of the output impedance is considerably simplified in the case of semiconductor components with a plurality of output driver stages.

FIG. 1c shows a circuit arrangement that is similar to that of FIG. 1b, but in which the impedance signal $V_{imp}$ is not generated at the driver stage itself that is to be adjusted. Instead, for this purpose a replica circuit 75, 85 is provided, in which the pull-up region and the pull-down region of the driver stage to be adjusted is duplicated. The impedance signal $V_{imp}$ is thus generated by feeding a current to the duplicated pull-up region or the duplicated pull-down region, where the impedance signal $V_{imp}$ corresponds to the voltage drop over the pull-up region or the pull-down region. The replica circuit 75, 85 is in this connection driven exactly like the driver stage to be adjusted, by the control signals BP0, . . . , BPn and BN0, . . . , BNn, in order to activate or deactivate the individual inverter branches of the pull-up region and of the pull-down region. Since the replica circuit 75, 85 is integrated, together with the driver stage to be adjusted, on the same semiconductor component, and is thus subject to the same variations in the production process, the same temperature fluctuations and the same fluctuations in supply voltage, the impedance signal $V_{imp}$ generated at the replica circuit 75, 85 is an accurate measure of the output impedance of the driver stage to be adjusted.

The circuit arrangement provided according to FIG. 1c offers an advantage that the impedance signal $V_{imp}$ can be generated also during the normal data transmission operation of the driver stage to be adjusted, with the result that it is possible to regulate the output impedance of the driver stage also in the operating mode. In addition, the control signals used for the adjustment of the replica circuit 75, 85 are temporarily stored in the register 70, 80, so that new values for the control signals may be adopted when the replica circuit 75, 85 is already adjusted to a better matched output impedance. Fluctuations occurring during regulation of the output impedance of the replica circuit 75, 85 thus do not have a disadvantageous effect on the driver stage to be adjusted. It is also possible with the circuit arrangement illustrated of FIG. 1c to adjust a plurality of driver stages with the values for the control signals that are stored in the registers 70 and 80.

FIG. 2 shows a detailed circuit design for generating the control signals BP0, . . . , BPn and BN0, . . . , BNn for adjusting the output impedance of a driver stage corresponding to, for example, the design illustrated of FIG. 1c (i.e., a replica circuit is used). According to the circuit design illustrated in FIG. 2, the reference signal $V_{ref}$ is generated by a band gap circuit 78, which supplies a precisely defined reference voltage that may be subject to slight temperature fluctuations. The reference voltage $V_{ref}$ is fed to the non-inverting input of a difference amplifier 77, the output of which is connected to the control terminal of a transistor 72. A further transistor 73, the transistor 72 and an external resistor 71 are connected in this order in series between a positive supply voltage $V_{DD}$ and ground. The transistor 72 is an NMOS transistor, while the transistor 73 is a PMOS transistor. The drain terminal of the PMOS transistor is connected to its control terminal. A voltage tapping between the transistor 72 and the external resistor 71 is connected to the inverting input of the difference amplifier 77 and is furthermore passed as input signal to the subtraction node 54. The circuit is thus configured in such a way that a current $I_0$ flows through the transistors 72, 73 and the external resistor 71, which current adopts such a value that the voltage at the tapping between the transistor 72 and the external resistor 71 corresponds to the reference voltage $V_{ref}$.

A replica circuit 85 of the pull-down region of the driver stage to be adjusted is connected in series with a transistor 74 between the positive supply voltage $V_{DD}$ and ground. The control terminal of the transistor 74, which like the transistor 73 is configured as a PMOS transistor, is connected to the control terminal of the transistor 73. The transistors 73 and 74 form a current mirror, the transistors 73, 74 being dimensioned in such a way that the current through the transistors 74 and the replica circuit 85 is greater by a factor N than the current $I_0$.

In the replica circuit 85 of the pull-down region of the driver stage to be adjusted, the current $N \times I_0$ flows through the pull-down transistors connected in parallel corresponding to the driver stage to be adjusted, and thus causes a voltage drop at a tapping between the transistor 74 and the replica circuit 85, which mirrors the output impedance of the pull-down region of the driver stage to be adjusted. This voltage drop forms the impedance signal $V_{imp}$. If the replica circuit 85 is adjusted in such a way that the impedance signal $V_{imp}$ corresponds to the reference signal $V_{ref}$, then the circuit design described ensures that the end-to-end resistance of the replica circuit 85 and thus the output impedance of the driver stage to be adjusted corresponds to the resistance value of the external resistor 71 divided by N.

In an example, the output impedance may be adjusted to a value in the region of 50 Ω. In a semiconductor component arrangement, line and lead resistances, for example of bonding wires, may be in the range of a few Ω. It is advantageous, as explained above, to compensate the output impedance on the basis of an external resistance that is greater by a multiple than the output impedance to be adjusted. An external resistance has in this connection the advantage that it is not subject to the same manufacturing variations and temperature fluctuations as the resistances of the semiconductor component manufactured according to polysilicon technology. The circuit design according to FIG. 2 thus ensures an accurate balance of the output impedance with a desired impedance without being subject to interfering influences on account of the manufacturing process of the semiconductor component, temperature, or supply voltage.

As has already been explained with respect to FIG. 1, the impedance signal $V_{imp}$ is filtered by means of the low-pass filter 51 and is then passed to the subtraction node 54, where it is subtracted from the reference signal $V_{ref}$ to generate the difference signal. The difference signal is passed to the sigma-delta modulator 58, the internal design of which is illustrated diagrammatically in FIG. 2. The sigma-delta modulator 58 back comprises an internal negative feedback loop that feeds the output signal of a quantiser of the sigma-delta modulator 58 to the signal input of the sigma-delta modulator 58. Due to the negative feedback loop in the sigma-delta modulator 58 a voltage misalignment that could for example be caused by the quantiser of the sigma-delta modulator 58 is suppressed. The output signal of the sigma-delta modulator 58 constitutes a digital bitstream signal that can adopt one of the two signal states "0" or "1" in each clock pulse period of the sigma-delta modulator 58.

The components of the control means 50 will now be discussed in more detail hereinafter with the aid of FIG. 2. The controller 50 comprise a first digital frequency counter 63 for the signal state "1", a second digital frequency counter 64 for the signal state "0", and a modulo counter 65 that causes the counts of the frequency counters 63 and 64 to be reset after a predetermined number of clock pulse periods. This predetermined number of clock pulse periods is for example 31, so that the sum of the counts of the frequency counters 63 and 64 may be at most 31. Obviously a different predetermined number of clock pulse periods may also be employed depending on the relevant requirements of the application. An odd number has the advantage that an unambiguous result is always obtained when comparing the counts.

For purposes of evaluation the counts S0 and S1 of the frequency counters 63 and 64 are subtracted from one another, for which purpose a subtraction node 66 is provided. The frequency difference, which is the difference of the counts S0 and S1 of the frequency counters 63 and 64, is identified as S2 in FIG. 2. The frequency difference S2 is passed to a comparator 67, which compares the frequency difference S2 with a predetermined threshold value. This threshold value is preferably 0, so that the comparator 67 establishes whether the frequency difference S2 is positive or negative. In the case, where the frequency difference is positive, the count of a digital counter 68 is increased by 1. In the reverse case, the count of the counter 68 is reduced by 1. The control signal BN0, . . . , BNn is generated depending on the count of the counter. In particular, the control signals BN0, . . . , BNn may be a digital coding of the count.

For example, if a count of the counter 68 of begins at 0, corresponding to a minimal number of activated inverter branches in the replica circuit 85, the count would be increased until the impedance signal $V_{imp}$ corresponds substantially to the reference signal $V_{ref}$. The count would then alternate between two adjacent values that correspond to an output impedance above the desired value and to an output impedance below the desired value. This state is detected by means of a monitoring circuit 62 and transmitted to a control unit 61, which by means of a register control signal RC causes the control signals BN0, . . . , BNn to be stored in a register 80 to be used by the driver stage or plurality of driver stages to be adjusted. The control unit 61 furthermore causes the count of the counter 68 to be updated, by a counter control signal CC, after the predetermined number of clock pulse signals (i.e., the frequency difference is evaluated). The control unit 61 is driven by the same clock pulse signal CLK as the sigma-delta modulator 58, wherein the counter control signal CC corresponds to a clock pulse signal that has a frequency that is less than the clock pulse signal CLK by a factor depending on the predetermined number of clock pulse periods, in the present case 32. The arrangement of frequency counters 63, 64 may ensure an averaging over the predetermined number of clock pulse periods of the sigma-delta modulator 58 to suppress a low-frequency noise.

Figure 3:
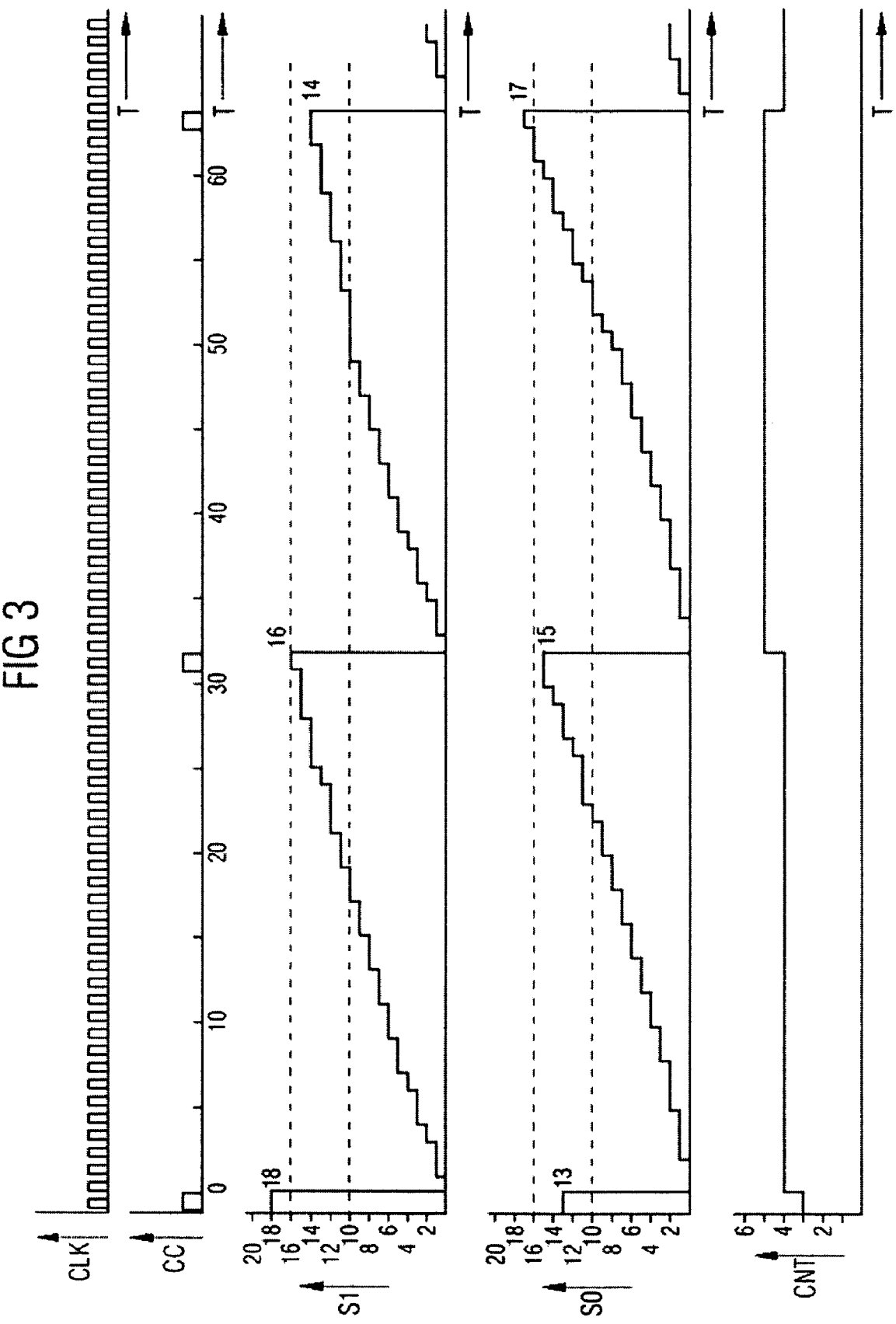
FIG. 3 illustrates signal-time curves of an adjustment of an output impedance.

FIG. 3 illustrates by way of example the time behavior of signals in the adjustment of the output impedance by the circuit illustrated in FIG. 2. The figure shows the clock pulse signal CLK, the counter control signal CC, the count S1 of the first frequency counter 63 for the signal state "1", the count S0 of the frequency counter for the signal state "0", and the count CNT of the counter 68. In a first evaluation at time T=0, S1 has a value of 18 and S0 has a value of 13, so that S1−S0=5. The frequency difference is thus positive and the count of the counter 68 is increased by 1. With a second evaluation at time T=32 S1 has a value of 16 and S0 has a value of 15, i.e. S1−S0=1. The frequency difference is thus positive, so that the counter 68 is again increased by 1. With a third evaluation at time T=64 S1 has a value of 14 and S0 has a value of 17 i.e. S1−S0=−3. The frequency difference is thus negative, and consequently the counter 68 is reduced by 1. Assuming that no changes occur on account of external influences, for example on account of temperature fluctuations, in the next evaluation a result corresponding to the evaluation at time T=32 would again be obtained, so that the count CNT of the counter 68 would alternate between the values 4 and 5. This state is recognized by the monitoring circuit 62, so that it can be arranged for the corresponding values of the control signals BN0 , . . . , BNn to be taken into the register 80.

Figure 4:
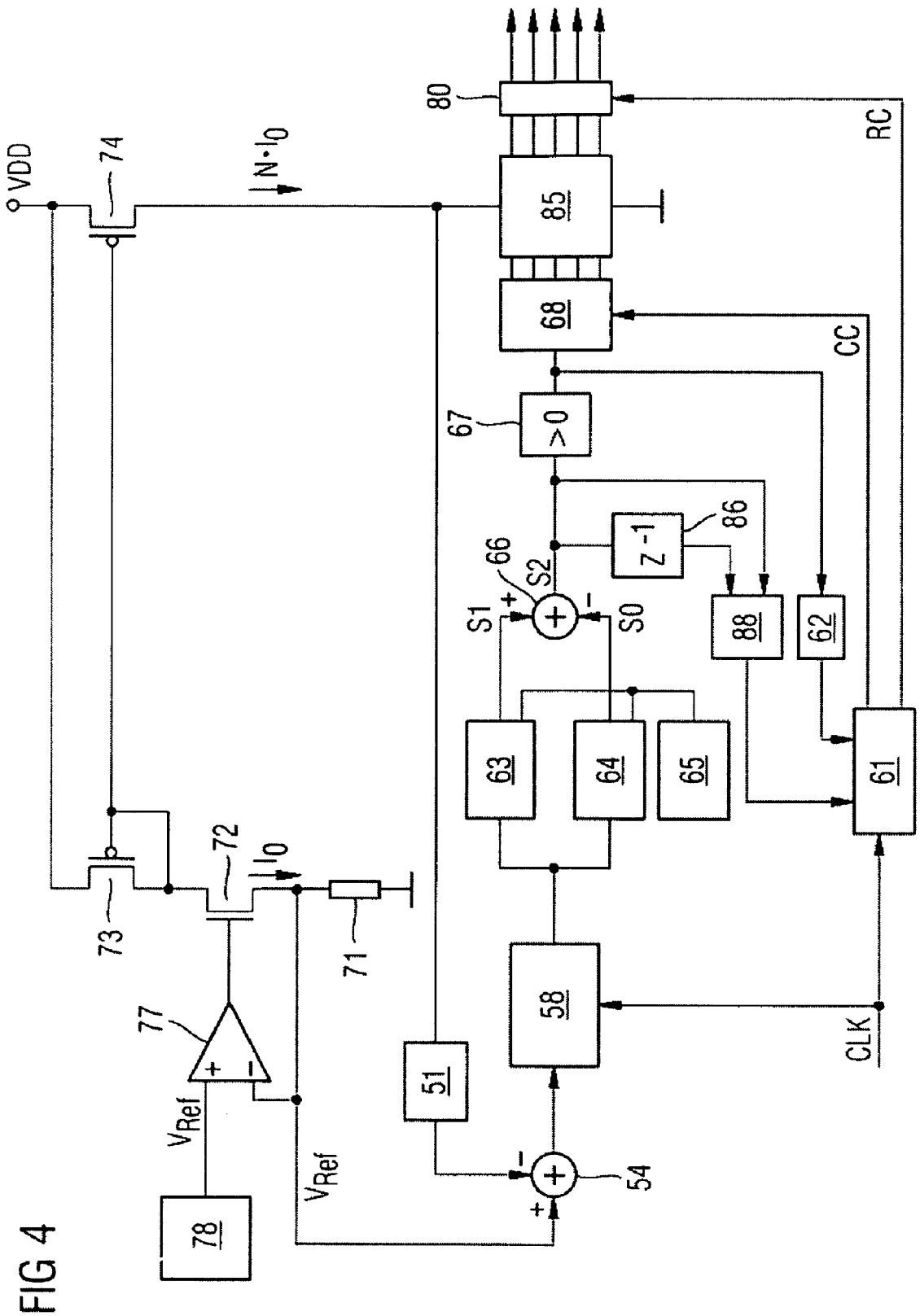
FIG. 4 illustrates a circuit implementation of an arrangement for adjusting the output impedance of a driver stage.

FIG. 4 shows a circuit design that corresponds substantially to that of FIG. 2, in which the controller 50 is in addition configured so that the absolute value of the newly-determined frequency difference can be compared to the absolute value of the frequency difference determined during the previous evaluation procedure, such as when the monitoring circuit 62 recognizes that the count CNT of the counter 68 alternates between two adjacent values. In this way a determination of which of the two adjacent counts CNT of the counter 68 corresponds to an output impedance that is closer to the desired value is made. In particular it is arranged by means of the control unit 61 that for that count CNT the values of the control signals BN0 , . . . , BNn are taken into the register 80, in which the frequency difference has a smaller absolute value. These measures are realized in the circuit design illustrated in FIG. 4 by providing a register 86 for storing the last evaluated frequency difference and providing a comparison means 88 for comparing the absolute values of the last-determined frequency difference and of the newly-determined frequency difference. An output signal of the comparison means 88 is passed to the control unit 61.

Referred to the representation shown in FIG. 3, the adjustment of the output impedance undertaken according to the circuit design of FIG. 4 would mean that the control signals BN0 , . . . , BNn that correspond to the count CNT of 4 are taken into the register 80, since for CNT=4 a frequency difference with an absolute value of 1 was determined, while for a count CNT=5 a frequency difference with an absolute value of 3 was determined. In this way it thus happens that the adjusted output impedance as a rule may deviate by less than one half step width of the adjustment from the desired value.

Figure 5:
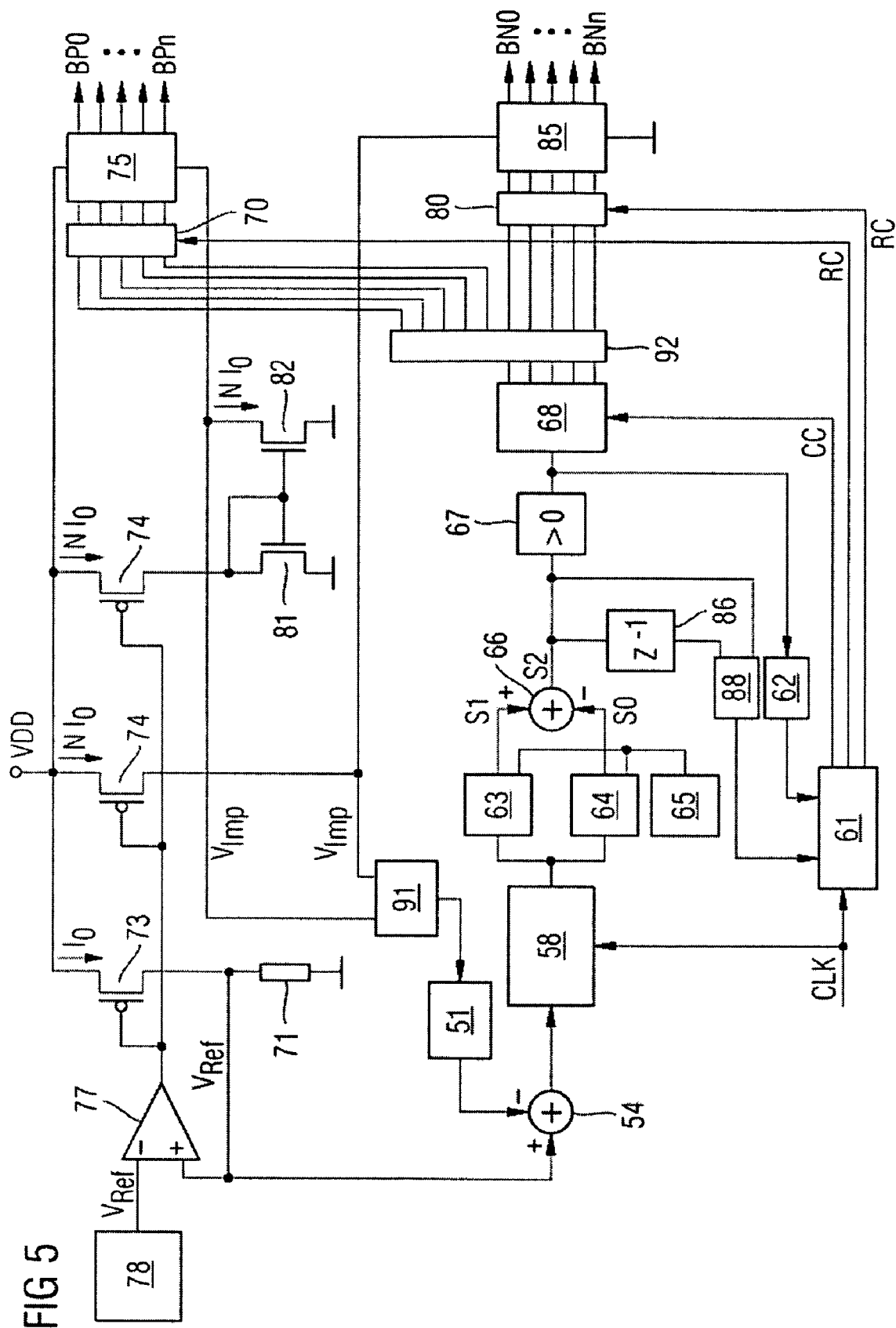
FIG. 5 illustrates a further embodiment in which an adjustment is made for a pull-up region of the driver stage as well as for a pull-down region of the driver stage.

FIG. 5 shows a circuit design configured to carry out a regulation of the output impedance both for the pull-down region as well as for the pull-up region of the driver stage to be adjusted. The illustrated circuit design corresponds in principle to that of FIG. 4, and may include a replica circuit 75 for the pull-up region of the driver stage to be adjusted. A multiplexer 91 passes either the impedance signal $V_{imp}$ from the pull-up replica circuit 75 or from the pull-down replica circuit 85 to the low-pass filter 51 and to the subtraction node 54. A demultiplexer 92 is used so that the count of the counter 68 provides a basis to adjust the pull-up replica circuit 75 or adjust the pull-down replica circuit 85. To store the control signals BP0, . . . , BPn, a register 70 is provided for the pull-up replica circuit 75, while to store the control signals BN0, . . . , BNn of the pull-down replica circuit 85 the register 80 is provided.

The current mirroring arrangement of FIG. 4 was adapted in such a way that the current N×$I_0$ is fed to the pull-up replica circuit 75 as well as to the pull-down replica circuit 85. For this purpose a further mirror transistor 74 is provided, which is connected in series with an NMOS transistor 81 between the positive supply voltage $V_{DD}$ and ground, the drain terminal of the NMOS transistor 81 being connected to its control terminal. The pull-up replica circuit 75 is connected in series with a further NMOS transistor 82 between the positive supply voltage and ground, the control terminal of the NMOS transistor 82 being connected to the control terminal of the NMOS transistor 81. The NMOS transistor 82 thus mirrors the current in the NMOS transistor 81 and serves as a current sink for the current through the pull-up replica circuit 75. In addition, in the circuit design according to FIG. 5 the transistor 72 has been omitted and instead the control output of the difference amplifier 77 is connected to the control input of the transistor 73. For this reason the polarities of the signal inputs of the difference amplifier 77 may also be reversed compared to the circuit design of FIG. 4.

Figure 6:
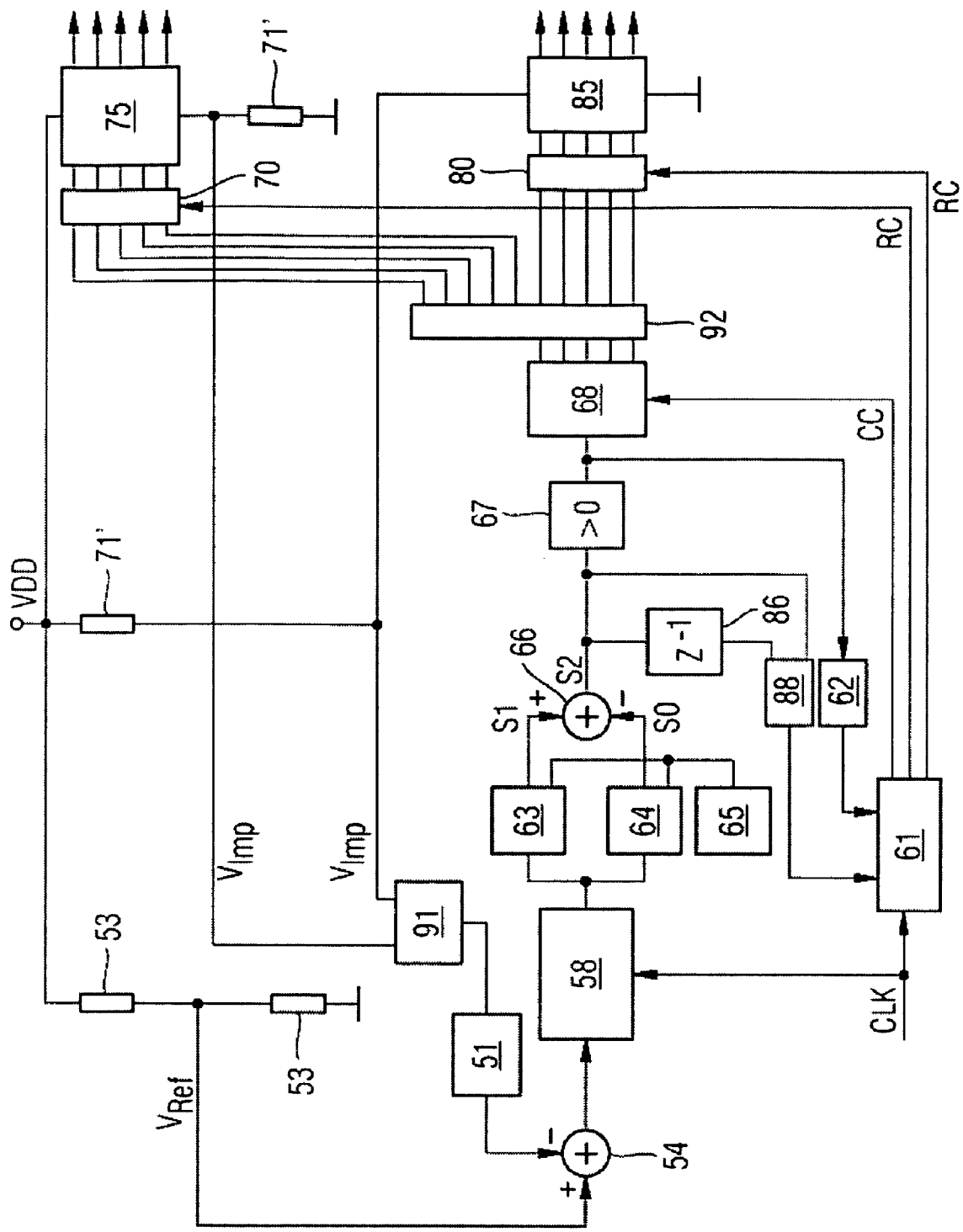
FIG. 6 shows a variant of the arrangement of FIG. 5, in which alternative means for generating a reference signal and an impedance signal are provided.
Figure 7:
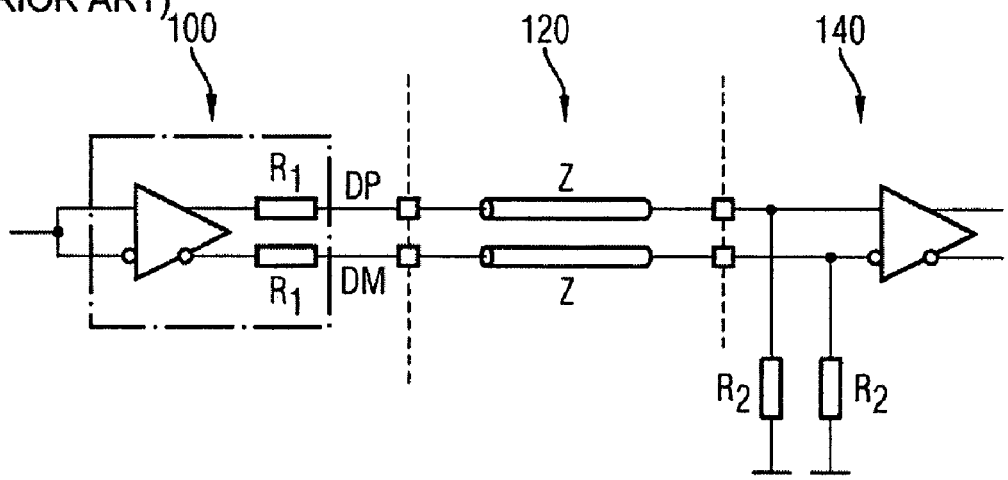
FIG. 7 shows a diagram for a model of the data transmission between a semiconductor transmitter and a semiconductor receiver.

By means of the circuit design of FIG. 5 control signals BP0, . . . , BPn for adjusting the pull-up region as well as control signals BN0, . . . , BNn for adjusting the pull-down region can be generated, where only a single control loop may be provided. FIG. 6 shows a circuit design that corresponds substantially to that of FIG. 5, though different means for generating the reference signal $V_{ref}$ and the impedance signal $V_{imp}$ are provided. To generate the reference signal, a voltage divider is connected between the positive supply voltage $V_{DD}$ and ground. The voltage divider comprises two resistors 53 of the same value, a tapping for the reference voltage $V_{ref}$ being arranged between the two resistors. The reference voltage $V_{ref}$ is in this case half the voltage difference between the positive supply voltage and ground, i.e. $V_{DD}/2$.

For the pull-up replica circuit 75 the impedance signal $V_{imp}$ is generated by connecting the pull-up replica circuit and an external resistor 71', in this order, between the positive supply voltage and ground. A further external resistor 71' and the pull-down replica circuit 85 are connected, in this order, between the positive supply voltage $V_{DD}$ and ground. A tapping for the impedance signal $V_{imp}$ is arranged in each case between the external resistor 71' and the corresponding replica circuit 75, 85. The pull-up replica circuit 75 and the pull-down replica circuit 85 thus form, together with the external resistor 71' associated with them, in each case a voltage divider. If the output impedance of the replica circuit 75, 85 corresponds to the resistance value of the external resistor 71', the voltage divider is symmetrical and the tapped voltage, which forms the impedance signal $V_{imp}$, corresponds to the half-positive supply voltage, i.e. $V_{imp}=V_{DD}/2=V_{ref}$. With this circuit too the output impedance is thus balanced by means of the external resistor 71'.

It is also possible to combine the measures for adjusting the output impedance discussed on the basis of FIG. 1, FIG. 2, FIG. 4, FIG. 5 and FIG. 6. In particular, the circuit arrangements illustrated in FIG. 2, FIG. 4, FIG. 5 and FIG. 6 may also be configured in such a way that the impedance signal is generated directly at the driver stage to be adjusted. Furthermore the alternatives illustrated in FIG. 1 as well as the arrangements of FIG. 2 and FIG. 4 may likewise be combined with the alternative configuration for generating the reference signal and the impedance signal according to FIG. 6.

Moreover it is possible to omit one of the frequency counters 63, 64, since at the evaluation time the sum of the counts S0 and S1 corresponds to the predetermined number of clock pulse periods. Thus, on the basis of the count of one frequency counter the frequency of the other signal state can be determined by calculating the difference relative to the predetermined number of clock pulse periods.

We claim:

1. A method for adjusting the output impedance of a driver stage, in which the output impedance of the driver stage is adjustable based on a control signal, comprising:
   generating an impedance signal being a measure of an output impedance of the driver stage;
   calculating a difference between the impedance signal and a reference signal;
   generating a difference signal;
   processing the difference signal using a sigma-delta modulator to generate a bitstream signal; and
   generating the control signal to adjust the output impedance depending on the bitstream signal.

2. The method of claim 1, wherein processing the difference signal using the sigma-delta modulator comprises associating the bitstream signal in each case with one of two signal states in a clock pulse period of the sigma-delta modulator and the frequency with which in each case one of the two signal states occurs depends on the difference signal, and wherein the method further comprises:
   detecting a respective frequency with which the two signal states occur;
   determining a frequency difference between the detected frequencies of the two signal states;
   comparing the frequency difference with a threshold value;
   modifying a counter depending on the comparison result; and
   generating the control signal for adjusting the output impedance depending on the count of the counter.

3. The method of claim 2, wherein comparing the frequency difference with the threshold value comprises determining whether the frequency difference is positive or negative.

4. The method of claim 2, wherein detecting the frequency with which one of the two signal states occurs comprises:
   increasing a frequency counter for this signal state when the signal state is detected; and
   evaluating the count of the frequency counter after a predetermined number of clock pulse periods.

5. The method of claim 4, wherein the method furthermore comprises resetting the frequency counter after the evaluation of the count.

6. The method of claim 4, comprising an odd predetermined number of clock pulse periods after which the evaluation is carded out.

7. The method of claim 4, comprising determining each of the two signal states of the frequency using a separate frequency counter.

8. The method of claim 4, comprising determining the frequency of a first of the two signal states using the frequency counter, and calculating the frequency of the second signal state depending on the difference between the predetermined number of clock pulse periods and the count of the frequency counter associated with the first signal state.

9. The method of claim 4, comprising:
   comparing the absolute value of the determined frequency difference and the absolute value of the frequency difference determined in a previous evaluation procedure; and
   generating the control signal depending on the value of the count of the counter corresponding to the smaller absolute value of the frequency difference.

10. The method of claim 1, comprising:
    generating the impedance signal by means of a replica circuit of a pull-up region or of a pull-down region of the driver stage to be adjusted.

11. The method of claim 10, wherein generating the impedance signal comprises:
    feeding a predetermined current to the replica circuit; and
    generating the impedance signals depending on a voltage drop over the replica circuit.

12. The method of claim 11, wherein the reference signal corresponds to a reference voltage, and wherein the predetermined current is generated depending on the reference voltage and an external resistor.

13. The method of claim 10, wherein generating the impedance signal comprises:
    applying a predetermined voltage to a series connection including the replica circuit and an external resistor, the impedance signal corresponding to the voltage drop over the replica circuit.

14. The method of claim 12, comprising generating the reference signal by applying the predetermined voltage to a voltage divider configured to divide the predetermined voltage in a ratio corresponding to a ratio of the output impedance to be adjusted to a resistance of the external resistor.

15. The method of claim 1, comprising:
    generating the impedance signal at a pull-up region or a pull-down region of the driver stage.

16. The method of claim 15, wherein generating the impedance signal comprises:
    feeding a predetermined current to the pull-up region or to the pull-down region, and
    generating the impedance signal depending on a voltage drop over the pull-up region or the pull-down region.

17. The method of claim 16, wherein the reference signal corresponds to a reference voltage, and wherein the predetermined current is generated depending on the reference voltage and an external resistor.

18. The method of claim 15, wherein generating the impedance signal comprises:
    applying a predetermined voltage to a series connection including the pull-up region or the pull-down region, and an external resistor, and the impedance signal corresponding to a voltage drop over the pull-up region or the pull-down region.

19. The method of claim 18, comprising generating the reference signal by applying the predetermined voltage to a voltage divider configured to divide the predetermined voltage according to a ratio corresponding to a ratio of the output impedance to be adjusted to the resistance value of the external resistor.

20. The method of claim 1, comprising filtering the impedance signal using a low-pass filter.

21. The method of claim 1, comprising storing the generated control signal in a register.

22. A circuit for adjusting an output impedance of a driver stage, wherein the output impedance of the driver stage can be adjusted depending on a control signal, the arrangement comprising:

an impedance detector configured to generate an impedance signal being a measure for an output impedance of the driver stage;
a subtractor configured to calculate a difference between the impedance signal and a reference signal, in order to generate a difference signal;
a sigma-delta modulator to which the difference signal is passed, the sigma-delta modulator generating a bitstream signal depending on the difference signal; and
a controller configured to generate, depending on the bitstream signal, the control signal for adjusting the output impedance.

23. The circuit of claim 22, wherein the controller comprises at least one frequency counter configured to increase a count of a frequency counter when the signal state associated with the frequency counter is detected, and evaluate the count of the at least one frequency counter in each case after a predetermined number of clock pulse periods of the sigma-delta modulator.

24. The circuit of claim 23, wherein the controller resets the at least one frequency counter after evaluation of the count.

25. The circuit of claim 22, wherein the impedance detector comprises a replica circuit of a pull-up region or of a pull-down region of the driver stage, the replica circuit being substantially similar to the pull-up region or the pull-down region of the driver stage and being driven by the control signals.

26. The circuit of claim 22, wherein the impedance detector generates the impedance signal at the driver stage.

27. The circuit of claim 22, wherein the reference signal generator comprises an external resistor.

28. The circuit of claim 22, wherein the reference signal generator comprises a band gap circuit that generates a reference voltage as the reference signal.

29. The circuit of claim 22, comprising a low-pass filter to filter the impedance signal.

30. A semiconductor component comprising:
a transmitter having a driver stage with an output impedance being adjustable according to a control signal;
a subtractor configured to generate a difference signal according to a difference between an impedance signal associated with the output impedance of the driver stage and a reference signal;
a sigma-delta modulator configured to generate a bitstream signal based on the difference signal; and
a controller generating the control signal according to the bitstream signal.

31. The semiconductor component of claim 30, where the controller comprises at least one frequency counter having a count that increases when a signal state associated with a frequency counter is detected, end evaluates the count in each case after a predetermined number of clock pulse periods of the sigma-delta modulator, the counter being resent after evaluation of the count.

32. The semiconductor component of claim 30, wherein the impedance detector comprises a replica circuit being substantially similar to a region of the driver stage, an impedance detector being driven by the control signals and generating the impedance signal at the driver stage.

33. The semiconductor component of claim 30, wherein the reference signal generator comprises:
an external resistor; and
a band gap circuit generating a reference voltage as the reference signal.

34. The semiconductor component of claim 30, comprising a low-pass filter to filter the impedance signal.

* * * * *

UNITED STATES PATENT AND TRADEMARK OFFICE
CERTIFICATE OF CORRECTION

| | |
|---|---|
| PATENT NO. | : 7,446,557 B2 |
| APPLICATION NO. | : 11/364961 |
| DATED | : November 4, 2008 |
| INVENTOR(S) | : Manfred Mauthe et al. |

It is certified that error appears in the above-identified patent and that said Letters Patent is hereby corrected as shown below:

In the Claims

In column 11, claim 6, line 58, before "out." delete "carded" and substitute --carried-- in its place.

In column 14, claim 31, line 19, after "the counter being" delete "resent" and substitute --reset-- in its place.

Signed and Sealed this

Twenty-first Day of April, 2009

JOHN DOLL
*Acting Director of the United States Patent and Trademark Office*